Jan. 14, 1964     H. K. CLARKE     3,117,388

INTERCHANGEABLE INSERT RING FOR FISHING ROD GUIDE

Filed June 18, 1962

INVENTOR.
HAROLD K. CLARKE
BY
ATTORNEY

United States Patent Office 3,117,388
Patented Jan. 14, 1964

3,117,388
INTERCHANGEABLE INSERT RING FOR
FISHING ROD GUIDE
Harold K. Clarke, 20 Laurel Hill Terrace,
New York 33, N.Y.
Filed June 18, 1962, Ser. No. 203,093
1 Claim. (Cl. 43—24)

This invention concerns a line guide ring construction for a fishing rod.

A principal object of the invention is to provide a quickly interchangeable bearing ring or eye for guiding a fishing line.

It has been proposed heretofore to provide a line or yarn guide ring or eye which is permanently attached to a pair of lugs. The lugs are secured to a fishing rod by whipping cord or wire. The ring may have a hardened inner surface against which the fishing line is drawn as it passes through the ring. The prior line guides have failed to provide for ready replacemnt of the ring when it becomes worn in use.

The present invention overcomes this deficiency in the prior known line guides by a simple, rugged, economical construction. The line guide rings subject to wear by passage of fishing line therethrough are detachably secured to a mounting base which may be permanently secured by whipping or lashing to a fishing line. The base is not disturbed when the ring is removed for replacement.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Figure 1:
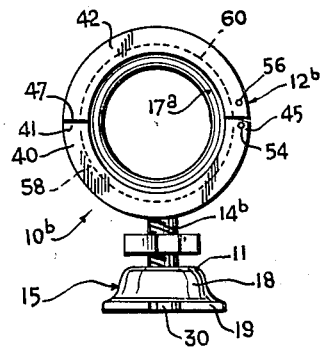
FIG. 1 is an end elevational view of a line guide.
Figure 2:
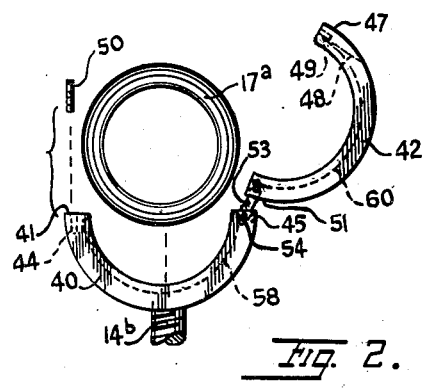
FIG. 2 is an exploded end elevational view of the line guide of FIG. 1 in open position with associated parts removed.
Figure 3:
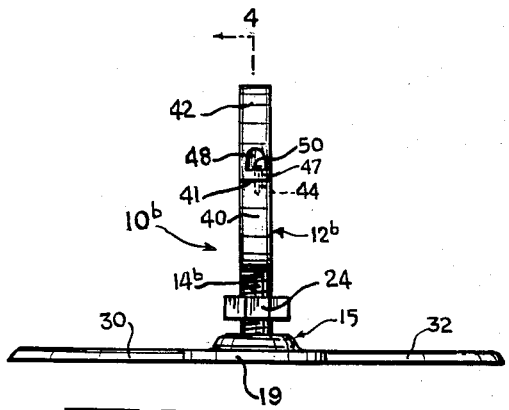
FIG. 3 is a side elevational view of the line guide of FIGS. 1 and 2.
Figure 4:
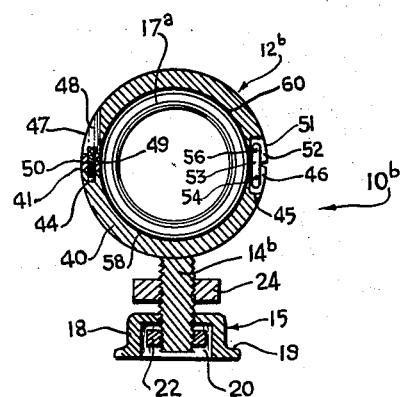
FIG. 4 is a cross-sectional view taken on line 4—4 of FIG. 3.

FIGS. 1–4 show another line guide $10^b$ in which base 15 is again the same as described in connection with line guides 10 and $10^a$. Ring $12^b$ is formed with two semicircular sections 40, 42. Section 40 is integral with threaded post $14^b$ which extends radially from this section. At one free end 41, the ring section 40 has a threaded hole 44. At its other free end 45, section 40 has a slot 46. The other section 42 has a recess 48 formed near its free end 47. In this recess terminates a threaded hole 49 which aligns with hole 44 when the ring is closed as shown in FIG. 4. A set screw 50 is removably seated in the aligned holes 44, 49. The other free end 51 of ring section 42 has a slot 52. A link 53 is pivotally secured to section ends 45, 51 by pintle pins 54, 56. The ends of the link fit into slots 46, 52 and the pintles 54, 56 extend across the slots 46, 52, respectively. A circular liner ring $17^a$ fits removably inside ring $12^b$. Ring sections 40, 42 are provided with opposing inner semicircular grooves 58, 60 which receive the ring $17^a$. Liner ring $17^a$ is removed by unscrewing set screw 50 and opening the sections as shown in FIG. 7. A new liner ring $17^a$ can be inserted in groove 58 and the open section 42 can then be closed down on section 40 to engage the upper half of ring $17^a$ in groove 60. The ring $17^a$ is then secured in ring $12^b$ by screwing the set screw to the two section ends 41, 47.

In all forms of the invention described, the ring or ring insert which guides the fishing line is replaceable by replacing the entire ring or by replacing only the ring insert. In any case, the base 15 is not disturbed and remains as a permanent part of the line. If desired, the lugs of the base 15 can be permanently secured to the fishing line L by other means than whipping cord.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

A fishing line guide, comprising a base including a hollow flanged boss, a pair of elongated lugs extending radially outward of said boss in axial alignment for attachment to a fishing rod, said boss having a noncircular cavity therein and a top with a hole therein opening into the cavity, a line guiding ring including two semicircular sections, a post integral with one section and extending radially thereof, said post being inserted into said hole, a nut in said cavity engaged on the post, a locknut engaged on the post outside of the boss and locking the post immovably to the base when the locknut is tightened on the top of the boss, hinge means pivotally securing one end of one section to one end of the other section, lock means for closing the ring detachably securing the other end of the one section to the other end of the other section, and a smooth circular liner removably engaged between the closed sections, each of said sections having a semicircular groove therein, said grooves opposing each other when the sections are closed, said liner being removably seated in the opposing grooves, said lock means including a pair of aligned threaded holes in the other ends of the sections and a set screw removably inserted in said aligned holes.

References Cited in the file of this patent
UNITED STATES PATENTS

| 1,141,684 | Becher | June 1, 1915 |
| 1,409,524 | Chase | Mar. 14, 1922 |
| 1,903,863 | Hayden | Apr. 18, 1933 |
| 2,452,406 | Volkery et al. | Oct. 26, 1948 |
| 2,689,141 | Kiekhaefer | Sept. 14, 1954 |
| 2,836,447 | Wright | May 27, 1958 |

FOREIGN PATENTS

| 23,619 | Great Britain | 1912 |
| 22,450 | Great Britain | 1913 |